United States Patent
Callaghan

(10) Patent No.: US 10,437,428 B2
(45) Date of Patent: Oct. 8, 2019

(54) SCATTER COPY SUPPORTING PARTIAL PASTE FUNCTIONALITY

(71) Applicant: Microsoft Technology Licensing, LLC, Redmond, WA (US)

(72) Inventor: David Michael Callaghan, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 15/603,011

(22) Filed: May 23, 2017

(65) Prior Publication Data

US 2018/0341371 A1 Nov. 29, 2018

(51) Int. Cl.
| | |
|---|---|
| G06F 3/048 | (2013.01) |
| G06F 3/0482 | (2013.01) |
| G06F 17/27 | (2006.01) |
| G06F 17/24 | (2006.01) |
| G06F 3/0484 | (2013.01) |

(52) U.S. Cl.
CPC .......... *G06F 3/0482* (2013.01); *G06F 3/0484* (2013.01); *G06F 3/04842* (2013.01); *G06F 17/245* (2013.01); *G06F 17/246* (2013.01); *G06F 17/2765* (2013.01)

(58) Field of Classification Search
CPC .................................................. G06F 3/0481
See application file for complete search history.

(56) References Cited

U.S. PATENT DOCUMENTS

| | | |
|---|---|---|
| 6,631,497 B1 | 10/2003 | Jamshidi et al. |
| 7,275,207 B2 | 9/2007 | Aureglia et al. |
| 7,472,339 B2 | 12/2008 | Bauchot |
| 2002/0007380 A1 | 1/2002 | Bauchot et al. |
| 2003/0188256 A1 | 10/2003 | Aureglia et al. |
| 2004/0143788 A1 | 7/2004 | Aureglia et al. |
| 2004/0172584 A1 | 9/2004 | Jones et al. |
| 2005/0015379 A1 | 1/2005 | Aureglia et al. |
| 2005/0149848 A1 | 7/2005 | Broman et al. |
| 2005/0210401 A1 | 9/2005 | Ketola et al. |
| 2007/0050697 A1 | 3/2007 | Lewis-bowen et al. |

(Continued)

OTHER PUBLICATIONS

"Learn Excel 2011 for Mac", Guy Hart-Davis, 2011, (hereinafter Learn Excel), 2011.*
Stylos, et al., "Citrine: Providing Intelligent Copy-and-Paste", In Proceedings of 17th Annual ACM Symposium on User Interface Software and Technology, Oct. 24, 2004, pp. 185-188.
Ives, et al., "Interactive Data Integration through Smart Copy & Paste", In Proceedings of Fourth Biennial Conference on Innovative Data Systems Research, Jan. 4, 2009, 10 pages.

(Continued)

*Primary Examiner* — Matthew Ell

(57) ABSTRACT

Various embodiments of the present technology generally relate to systems and methods for copying and pasting data. More specifically, some embodiments relate to selective cut and paste feature where the user can select non-adjacent (or non-contiguously located) portions of the source data that can be copied to the clipboard and pasted to a desired destination. In addition, some embodiments, provide for a partial paste functionality that allows users to paste only a portion of the data stored on the clipboard. In some embodiments, a modality of an application or modality of the data can be determined by the copy/paste application. For example, the modality may indicate that the data is an image or text. Based on the modality of the application or modality of the data, a set of partial paste functionalities (e.g., OCR, cropping, editing, data subset selection, etc.) can be offered to the user.

20 Claims, 9 Drawing Sheets

(56) References Cited

U.S. PATENT DOCUMENTS

| | | | |
|---|---|---|---|
| 2007/0156775 A1* | 7/2007 | Fischer | G06F 9/543 |
| 2010/0083092 A1* | 4/2010 | Schuller | G06F 17/246 |
| | | | 715/227 |
| 2010/0122160 A1* | 5/2010 | Chirakansakcharoen | |
| | | | G06F 3/0481 |
| | | | 715/256 |
| 2010/0153968 A1* | 6/2010 | Engel | G06F 9/543 |
| | | | 719/313 |
| 2011/0126092 A1 | 5/2011 | Harris | |
| 2011/0202823 A1* | 8/2011 | Berger | G06F 17/246 |
| | | | 715/217 |
| 2012/0189203 A1* | 7/2012 | Lin | G06F 17/30253 |
| | | | 382/181 |
| 2013/0054731 A1 | 2/2013 | Branton | |
| 2014/0188802 A1 | 7/2014 | Branton et al. | |
| 2015/0212981 A1* | 7/2015 | Wakefield | G06F 17/212 |
| | | | 715/274 |

OTHER PUBLICATIONS

"Convert Excel Spreadsheets into Web Database Applications", http://web.archive.org/web/20150905053502/http:/www.caspio.com/convert-excel-spreadsheets-to-web/, Published on: Sep. 5, 2015, 3 pages.

"Copy "e;outputs"e; from 1 model to another or . . . partial pasting . . . #2718", https://github.com/opentx/openbc/issues/2718, Published on: Aug. 16, 2015, 4 pages.

"Move, copy, and delete selected pixels", https://helpx.adobe.com/photoshop/using/moving-copying-deleting-selected-pixels.html, Retrieved on: Feb. 20, 2017, 9 pages.

"Advanced copy and paste with web clipboard—Google Apps Tips", http://gappstips.com/google-drive/advanced-copy-and-paste-with-web-clipboard/, Published on: 2014, 6 pages.

* cited by examiner

SCATTER COPY SUPPORTING PARTIAL PASTE FUNCTIONALITY

BACKGROUND

Many users of electronic devices routinely utilize some type of personal productivity software that often includes a variety of software applications. These software applications can include word processing applications, spreadsheet applications, e-mail clients, notetaking software, presentation applications, digital image editing applications, and others. The applications available in these software suites are often used by individuals in school and business to create documents, presentations, and various reports. These applications can also be used to perform calculations, produce charts, organize data, receive and send e-mails, and the like.

In many cases, users are copying portions of data within one of the software applications and pasting that data to a new location within the same or different software application. However, copying unconnected portions of data can be an awkward task for the user. One solution employed by some users requires the entirety of the data be copied and pasted in a desired location. Then, the user would manually delete the undesired portions of data. Another solution employed by some users is the use of multiple copy and paste commands that select only a portion of the data desired to be copied. As a result, the ability to copy non-adjacent portions of data wastes the time and energy of the user and potentially device memory and energy because the user is taking more time to complete the task than it should due to the inefficiencies of the traditional copy and paste user interface when interacting with the aforementioned applications.

Overall, the examples herein of some prior or related systems and their associated limitations are intended to be illustrative and not exclusive. Upon reading the following, other limitations of existing or prior systems will become apparent to those of skill in the art.

OVERVIEW

Various embodiments of the present technology generally relate to systems and methods for copying and pasting data. More specifically, some embodiments provide for improved systems and methods for implementing improved copy and paste features. In some embodiments, a method for copying and pasting data that includes identifying, in response to a request to copy data, data selected by a user. The data (e.g., visualized data such as images, text, cells within a table, lists, visual objects representing data stores like files etc.) selected by the user may include at least two data portions that are not adjacently located. The data selected by the user can be copied to a clipboard (e.g., an application clipboard, an operating system clipboard, a cloud-based clipboard, etc.). Then, in response to a request to a paste request, the data from at least some of the data selected by the user can be pasted to a selected location. In some embodiments, a modality of an application or modality of the data can be determined by the copy/paste application. Based on the modality of the application or modality of the data, a set of partial paste functionalities can be offered to the user. For example, the copy paste application may identify whether the data includes an image and offer to perform an optical character recognition or additional rendering based on an object identification.

Some embodiments generate, in response to the request to a paste request, a graphical user interface that can be displayed on a client device. The graphical user interface can include a first option to paste that upon selection creates a table preserving a relative location of the data and the table created may include empty cells as position place holders for the data that was not selected for copying. Some embodiments of the graphical user interface also include a second option to paste that creates a list of only the data and a third option presenting a visual representation of the data and allowing the user to crop the visual representation. A fourth option may also be included that allows the user to select a subset of the data from data copied to the clipboard. When the data includes an image, some embodiments include an optical character recognition routine to identify text within the images. In some embodiments, the data can be viewed by the user via an application that includes a copy and paste handler and a metadata stripper that allows the user to view the data without seeing or having access to any associated metadata.

In some embodiments, the data can be located in multiple, non-contiguously located cells of a table. The data can be copied to the clipboard where multiple entries can be created. For example, a first entry can include all of the table along with a list identifying the selected cells. A second entry can include only the selected cells and preserves a relative location of the selected cells within the table. A third entry can include interleaved text from data collected from the selected cells. A fourth entry can include only the selected cells with any unselected cell removed. In accordance with various embodiments, the clipboard may also include different data structures that include metadata and the data identified in the request to copy. The different data structures can be accessed by a paste application which can then formats the metadata and data before pasting to a location identified by the user.

For example, the user may select to copy a few elements of data from within a well-formed XML document and the paste operation will ensure that the paste results in a well-formed XML document by adding missing metadata tags or reformatting the metadata as necessary. Similarly, if a user were to select copying a few cells of a table encoded in HTML, the paste operation would add or create the missing HTML table metadata to result in a well-formed HTML table layout and include missing CSS style information that was present in the table which was the source of the copy paste operation.

Embodiments of the present invention also include computer-readable storage media containing sets of instructions to cause one or more processors to perform the methods, variations of the methods, and other operations described herein.

Some embodiments provide for a system having one or more processors, computer readable media, and office productivity applications (e.g., spreadsheet applications). The application can be stored on the one or more computer readable media, and include program instructions which, when executed by the one or more processors, direct the one or more processors to identify, in response to a request to copy data, multiple cells selected by a user within a first table. In accordance with some embodiments, the multiple cells selected by the user include at least two cells non-contiguously located within the first table. The one or more processors can copy at least the multiple cells selected by a user to a clipboard and create, in response to a request to paste, a second table having cells that include multiple cells selected by the user within the first table. The user may select between multiple pasting options, including but not limited to, having multiple cells copied from the first table adjacent to each other in a contiguous block within the second table, interleaving copied text, or presenting the entire table with only the selected data positioned in the data's original location.

Some embodiments may create multiple entries in the clipboard. For example, some embodiments may automatically identify a border that encompasses the multiple cells selected by the user and copy all of the cells within the boarder are copied to the clipboard as one entry. Some embodiments may copy a link to the selected cells in the source document that can be resolved into the information that needs to be copied when the paste operation occurs, such as a Universal Resource Identifier (URI) that can identify specific information within the document selected for copy and paste. As another example, an entry may include just the selected cells. The clipboard may be an application clipboard created using a plug-in on browser running on a client device, a cloud-based clipboard, or variant thereof.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Embodiments of the present technology will be described and explained through the use of the accompanying drawings in which.

Figure 1:
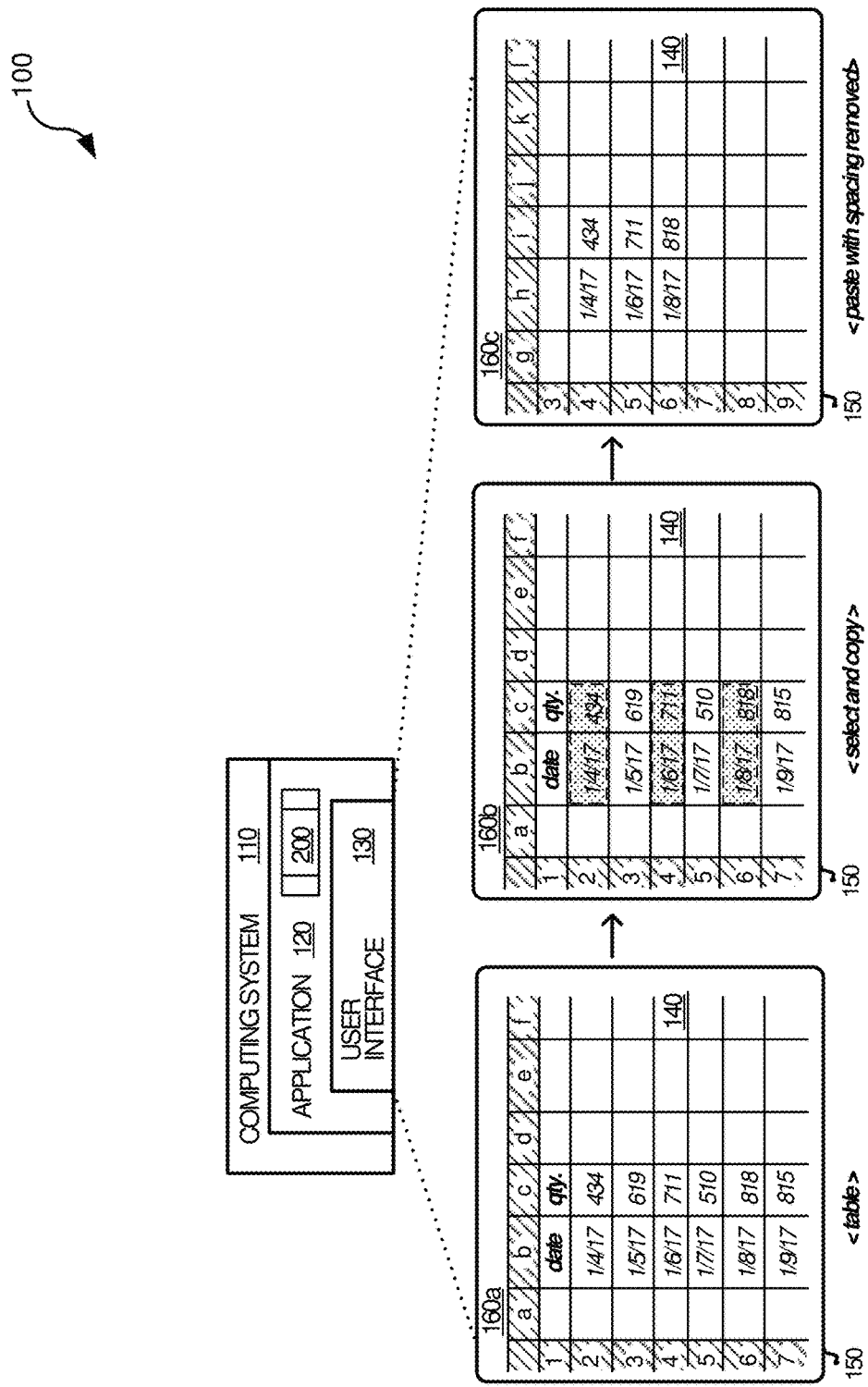
FIG. 1 illustrates an example of an environment capable of implementing enhanced copy and paste operations in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to smarter copy and paste functionalities. More specifically, some embodiments relate to selective cut and paste feature for tables where the user can select non-adjacent (or non-contiguously located) cells that can be copied to the clipboard and pasted to a desired destination. In addition, some embodiments, provide for a partial paste functionality that allows users to paste only a portion of the data stored on the clipboard. Users of traditional copy and paste applications have been unable to copy disjoint portions of data (e.g., cells within a table that are not located in a contiguous block). As a result, user have traditionally had to copy the larger contiguous block and then delete the unwanted cells. Moreover, if the user changed their mind about the portion of the copied data, then the user had to select a new set of data and copy again as there was no way to partially paste the data stored in the clipboard. As a result, the users of traditional copy and paste features have had to perform unwanted additional steps.

In contrast, various embodiments eliminate these additional user interactions allowing a user to copy portions of data. Some embodiments, can identify, in response to a request to copy data, data selected by a user. The data (e.g., images, text, cells within a table, etc.) selected by the user may include at least to data portions that are not adjacently located. For example, a user may be allowed to select two or more portions of an image using multiple bounding boxes. Similarly, the user may select non-adjacent cells within a spreadsheet or text that is not contiguous. In some embodiments, the copy operation will allow the user to select multiple regions of a sentence or paragraph, such as groups of single letters all the way through phrases and segments of words or letters for the copy operation to select that will be pasted into a contiguous sentence when the paste operation is performed. The paste operation may include automatic text formatting such as proper beginning sentence capitalization, spell check and grammar formatting, and adding proper punctuation such as sentence ending period or fixing beginning and ending quotes if missing etc.

The data selected by the user can be copied to a clipboard (e.g., an application clipboard, an operating system clipboard, a cloud-based clipboard, etc.). Then, in response to a paste request, the data from at least some of the data selected by the user can be pasted to a selected location.

In some embodiments, a modality of an application or modality of the data can be determined by the copy/paste application. For example, the modality may indicate that the data is an image or text. Based on the modality of the application or modality of the data, a set of partial paste functionalities can be offered to the user. For example, the copy paste application may identify whether the data includes an image and offer to perform an optical character recognition or additional rendering based on an object identification.

Some embodiments generate, in response to the request to a paste request, a graphical user interface that can be displayed on a client device. The graphical user interface can include a first option to paste, that upon selection, creates a table preserving a relative location of the data. Some embodiments of the graphical user interface also include a second option to paste that creates a list of only the data and a third option presenting a visual representation of the data and allowing the user to crop the visual representation. A fourth option may also be included that allows the user to select a subset of the data from data copied to the clipboard. When the data includes an image, some embodiments include an optical character recognition routine to identify text within the images. In some embodiments, the data can be viewed by the user via an application that includes a copy and paste handler and a metadata stripper Various embodiments of the present technology provide for a wide range of technical effects, advantages, and/or improvements to computing systems and components. For example, various embodiments include one or more of the following technical effects, advantages, and/or improvements: 1) reducing the number of user interactions when copying and pasting data; 2) automatically identifies additional data a user may desire be copied along with a selected data set; 3) creates a new format for storing data with a clipboard or memory; 4) creating improvements to the way computing devices operate; 5) use unconventional and non-routine operations as part of the copy and paste process to allow the user to modify and paste selected portions of the clipboard content; 6) use of additional graphical user interfaces for selecting between various pasting options enabled by the enhanced copy/paste tools; and/or 7) changing the manner in which a computing system reacts to a request to copy and paste data. Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to creating smarter copy and paste functionality with tables, text and images, embodiments of the present technology are equally applicable to various other copy and paste application pairings such as, but not limited to, allowing a user to simultaneously copy a portion of an e-mail body, the subject line, and/or recipients. As another example, data portions that are located in different documents may be selected and copied simultaneously.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

FIG. 1 illustrates an example of an environment 100 capable of implementing enhanced copy and paste operations in accordance with some embodiments of the present technology. Implementation 100 involves computing system 110 on which application 120 runs. When executing, application 120 drives a user interface 130 through which a user may interact with application 120.

Figure 9:
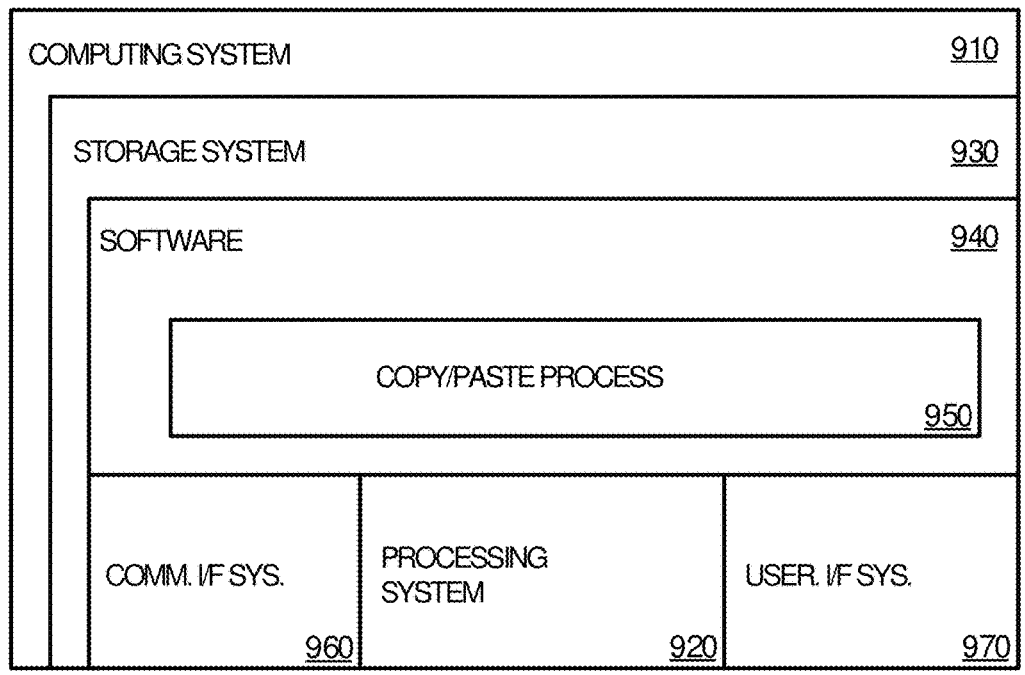
FIG. 9 illustrates an example of a computing system, which is representative of any system or collection of systems in which the various applications, services, scenarios, and processes disclosed herein may be implemented.

Computing system 110 is representative of any computing system capable of running an application natively or in the context of a web browser, streaming an application, or executing an application in any other manner Examples of computing system 110 include, but are not limited to, personal computers, mobile phones, tablet computers, desktop computers, laptop computers, wearable computing devices, or any other form factor, including any combination of computers or variations thereof. Computing system 110 may include various hardware and software elements in a supporting architecture suitable for providing application 120. One such representative architecture is illustrated in FIG. 9 with respect to computing system 910.

Application 120 is representative of any software application capable of creating data that can be copied and pasted. Examples include, but are not limited to, spreadsheet applications, word processing applications, presentation applications, email applications, social networking applications, gaming applications, business management applications, note taking applications, video or image editing applications, and any other type of combination, variation, or combination thereof. Application 120 may be implemented as a natively installed and executed application, a browser-based application, a streaming or streamed application, a mobile application, or in any other suitable manner.

Application 120 may monitor user interface 130 for a selection of cells 140 within table 150. In the examples illustrated in FIG. 1, user interface 130 includes a view of a spreadsheet workbook hosted by application 120. The view of the spreadsheet workbook includes a canvas 160a-160c with cells 140 defined by rows and columns. In this scenario, two columns of data have been entered in cells 140 with headers of in cells b1 and c1 with labels "date" and "qty," respectively. As a user interaction occurs with respect to user interface 130 one or more of the cells can be selected. User interface 130 may allow the user to select a discontinuous subset of the cells presented in canvas 160. For example, the user may select two or more cells that do not share an adjacent side corresponding cell walls. The user interaction may be, for example, a touch, mouse click, voice command, gaze tracking, or other such interaction, including assistance from an artificial intelligence personal assistant such as Microsoft Cortana to assist the user to select the desired cells using voice commands for example or descriptions and instructions that identify the desired cells. As illustrated in canvas 160*b*, cells 2*b*-2*c*, 4*b*-4*c*, and 6*b*-6*c* have been selected by the user. In this case, the user did not select the intermediate cells in rows three and five.

After selection of the cells, the user can request that the cells be copied and then pasted in a new location. In accordance with various embodiments, the copy operation copies the disconnected cells selected by the user. When the user requests the cells be pasted, the selected cells can be reformatted removing the unselected cells (e.g., cells b3, c3, b5 and c5) as illustrated in canvas 160*c*. Other formatting options may also be available to the user such as interleaving the content to create a single row or column. The system can choose a default paste option and the user can be offered for a limited amount of time or limited by events the choice to change the paste to another format such as interleaved single column which changes the paste without having to delete it and paste it again selecting the preferred format.

Figure 2:
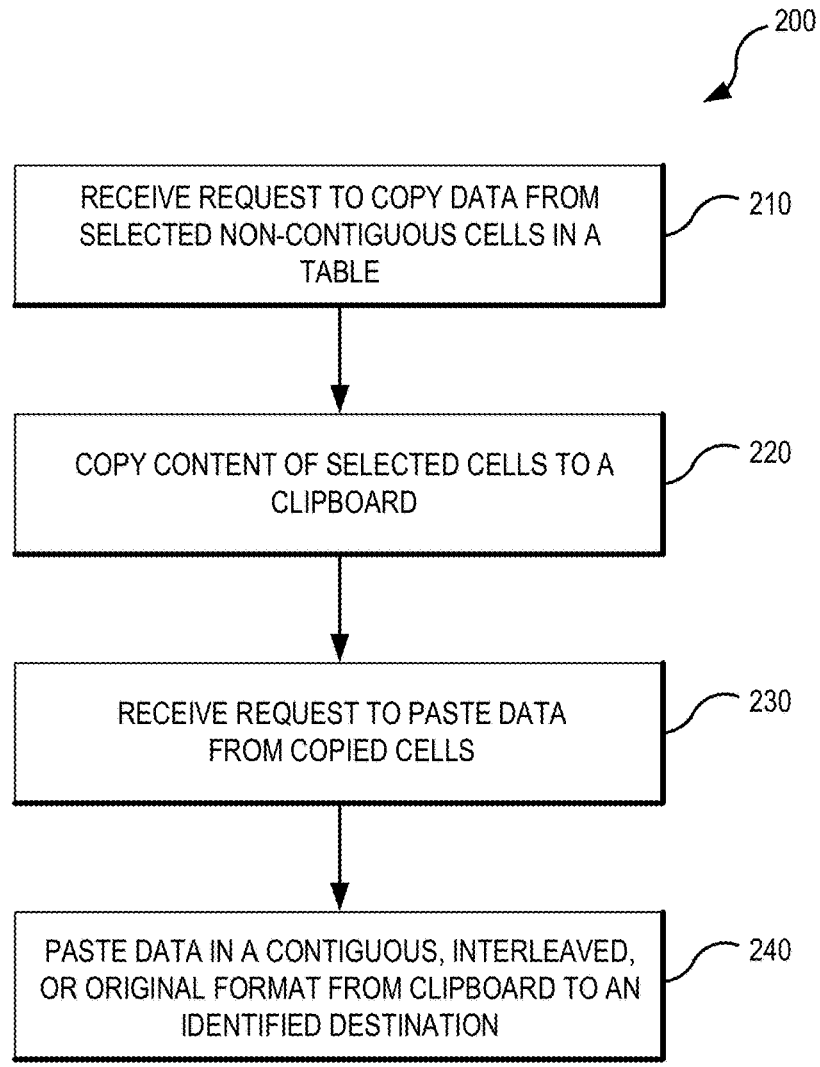
FIG. 2 illustrates an example of a set of operations for an enhanced copy and paste according to one or more embodiments of the present technology.

FIG. 2 illustrates an example of a set of operations 200 for an enhanced copy and paste according to one or more embodiments of the present technology. Some or all of the steps of the enhanced copy and paste process 200 may be implemented in program instructions in the context of the component or components of the application or utilities used to carry out the copy and paste actions.

During receiving operation 210 a request to copy data can be detected or received. For example, the data may be from a selected portion of a table created in application 120, a website, an image, an email, text message or other source document. Copy operation 220 can copy the content of the selected cells to a clipboard (e.g., an application clipboard, operating system clipboard, cloud-based clipboard, etc.). In some embodiments, the non-contiguous copy operation can be performed on non-contiguous words or letters in a word, sentence or paragraph, a text message or non-contiguous selection of text messages etc., it is not limited to just cells in a spreadsheet table.

In some embodiments, copy operation 220 may create multiple entries in the clipboard. For example, copy operation 220 may create an entry by copying the entire table along with a data structure identifying the selected portions (e.g., locations of an image, cells of a spreadsheet, etc.) of the data. Some embodiments allow copy operation 220 to automatically identify a border that encompasses the multiple cells selected by the user and then copy all of the cells within the border are copied to the clipboard. As another example, copy operation may create an entry that includes just the selected data and/or an entry that includes all of the data within the border. In other embodiments, the information copied to the clipboard is a link to the information in the source document that can be resolved into the content and desired format when it is pasted. This latter option uses minimal memory in some circumstances because it does not make a duplicate copy of a large chunk of image, text, or other content that consumes a large amount of memory or storage to buffer temporarily. Other embodiments can keep a link to the source information and only create a separate copy if the source information changes before the paste operation is fully completed and the link to the data in the copy buffer is deleted.

Once receiving operation 230 receives or detects a request to paste the copied data, pasting operation 240 can paste the data from the clipboard to a destination selected by the user. In some embodiments, each portion of the selected data may be placed immediately adjacent to other portions of the data even though these portions were not adjacent in the original source of the data. In some embodiments, the user may have the option to select how the data is presented using a graphical user interface, widget or other command interface. For example, the user may be allowed to select a subset of the data copied to the clipboard for pasting, crop an image, have text presented in an interleaved fashion, present the data in the same relative location as in the source. In some embodiments, the pasting creates empty cells to maintain the original table layout creating placeholder cells for the unselected data which allow the table to maintain its original layout. In other embodiments, the empty or sparse table only containing the selected cells can be created when it is copied to the clipboard. Similarly, the copy could create links to the data and then populate a table inline, interleaved, or sparse layout as indicated by the user.

Figure 3:
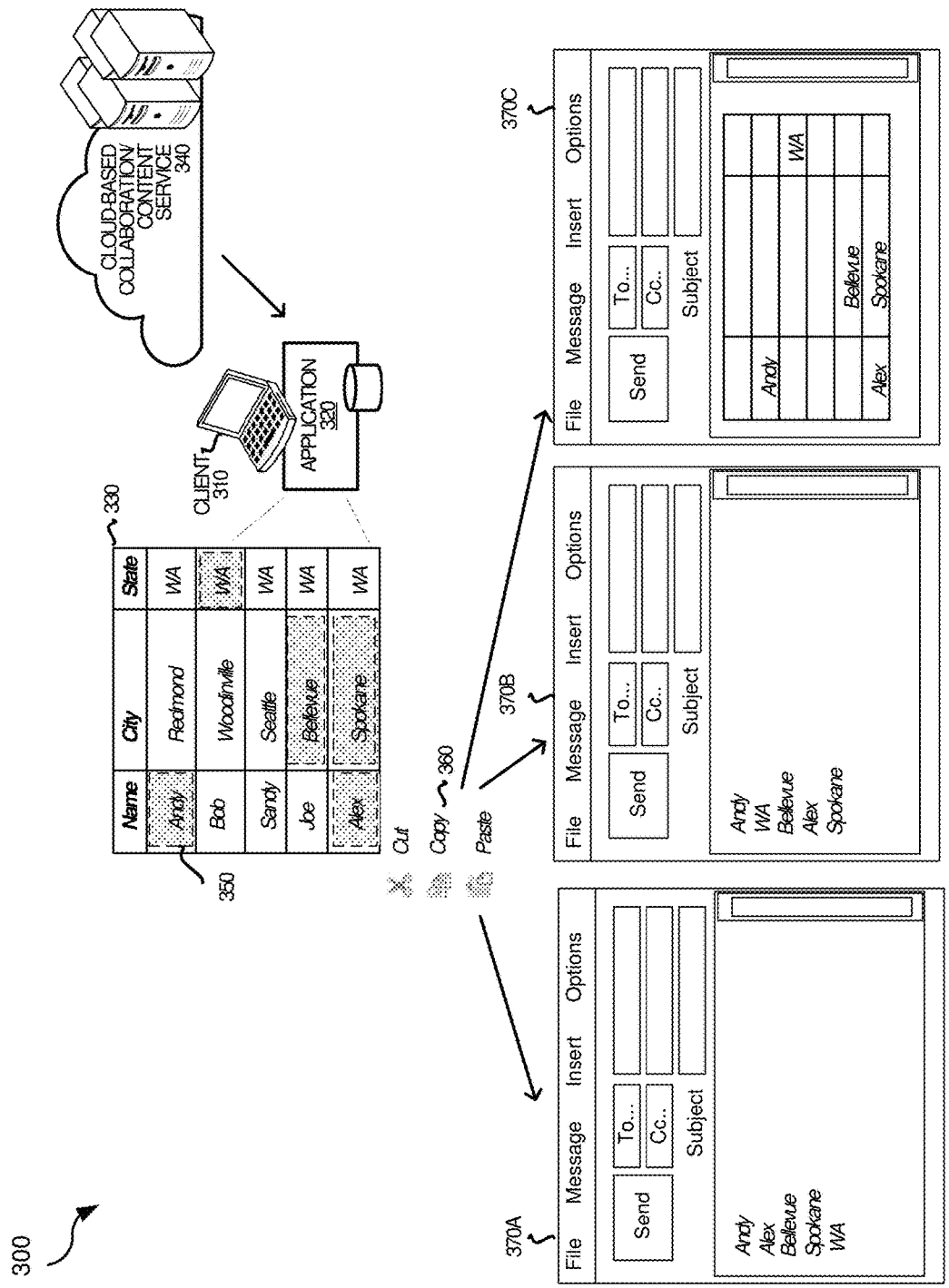
FIG. 3 illustrates a set of components associated with a cloud-based collaboration service supporting an enhanced copy and paste that may be used in one or more embodiments of the present technology.

FIG. 3 illustrates a set of components 300 associated with a cloud-based collaboration service supporting an enhanced copy and paste that may be used in one or more embodiments of the present technology. As illustrated in FIG. 3, client device 310 runs an application 320 that can access a source data 330 from a collaboration or content service 340. The collaboration or content service 340 is representative of any service providing shared access to cloud-based or centralized content and centralized storage such as, for example, Microsoft® SharePoint® Online (SPO) services, SharePoint®, a shared network drive, or the like. As shown in the example of FIG. 3, source data 330 can be opened on client device 310 with application 320. Application 320 can include functionality including GUIs (graphical user interface) running on client device 310, e.g., a PC, mobile phone device, a Web server, or other application servers. Such systems may employ one or more virtual machines, containers, or any other type of virtual computing resource.

A user can select a portion 350 of source data 330 and request that portion 350 be copied using menu 360 or other command interface (e.g., keyboard shortcut, voice command, etc.). The user can then request, e.g., using menu 360 or other command interface, that portion 350 be pasted into a new location. In accordance with some embodiments, there may be multiple options for how portion 350 is pasted. For example, one option shown in e-mail 370A may present the text within each row one after the other. Another option shown in e-mail 370B shows the pasted text presented in an interleaved fashion in a column that presents the selected data starting from the top row and going from left to right before moving to the next row having data selected by the user. Similarly, e-mail 370C illustrates another option where the original table structure and the selected data's location within the table structure is preserved. Various embodiments can organize the data in many other formats and options. In some embodiments, the user may be able to select subsets of the data copied to the clipboard for presentation in the new location.

Figure 4:
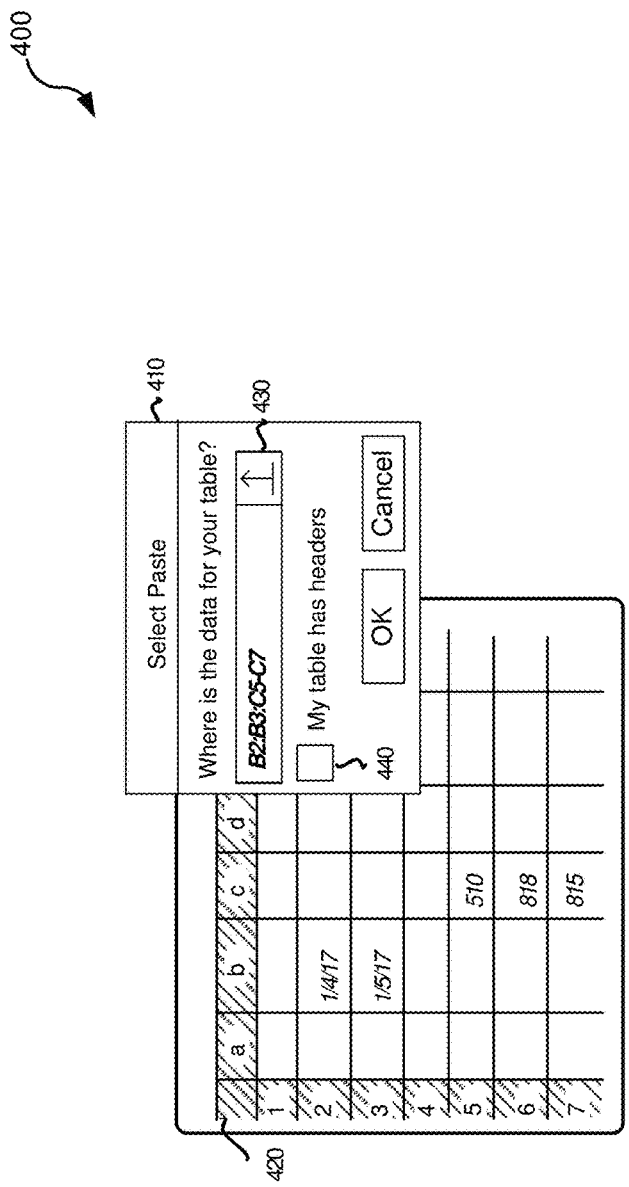
FIG. 4 illustrates an example of a partial paste graphical user interface that may be used in some embodiments of the present technology.

FIG. 4 illustrates an example of a partial paste graphical user interface that may be used in some embodiments of the present technology. Partial paste graphical user interface 410 can be used with data being copied to spreadsheet 420 where the user has a desired row and column location placement. As illustrated in FIG. 4, once the data has been copied to a clipboard, the user can be presented with the partial paste graphical user interface 410 that allows the user to select which data should presented in which row(s) and column(s) of spreadsheet 420. In the embodiments illustrated in FIG. 4, partial paste graphical user interface 410 allows the user to enter the row and column in box 430 for presentation of the data, selecting individual cells B2 and B3 separated in this instance by a colon ":" as well as encodings for spans of cells such as "C5-C7" which is cells C5 thru C7. In some embodiments, partial paste graphical user interface 410 may include syntax available to the user that will skip over data elements stored within the clipboard there by allowing not only customized locations but also customized selections of the data being pasted. If the user selects box 440, the pasting application will automatically identify and paste any headers associated with the rows and columns.

In some embodiments, the header can be automatically detected and copied by default, or the decision to automatically copy headers can be an application configuration setting or even an application developer decision based on a preferred user case or scenario without needing a user interface check box such as 440. A similar graphical user interface may be used for the selection of the data to copy to the clipboard. In accordance with various embodiments, the selection of cells for the copy can be assisted by an artificial intelligence (AI) agent such as Cortana.

The copy and paste of cells can be simplified by using descriptions of the cells, the next example is referring back to the table shown in FIG. 3 component 330. Some embodiments allow for a voice or text interaction with an artificial agent requesting the software "copy the first name in the table, along with Joe's and Alex's city and any one value from the State column" would result in the same effect as the copy of data selection shown in FIG. 3 component 330, which could then be pasted using a paste verbal command, keystroke or other input to result in any of the components 370A-C or other conceivable variant to the copy and paste. Paste commands could include descriptions to paste as an image such as a JPG instead of as text, or clear formatting etc., as well as modify the copy buffer before pasting, such as "Cortana, drop the state column data before pasting" to remove the "WA" from the clipboard copy before pasting the data or related command to "Cortana, drop the state column data from the paste data" to modify the pasted data.

Figure 5:
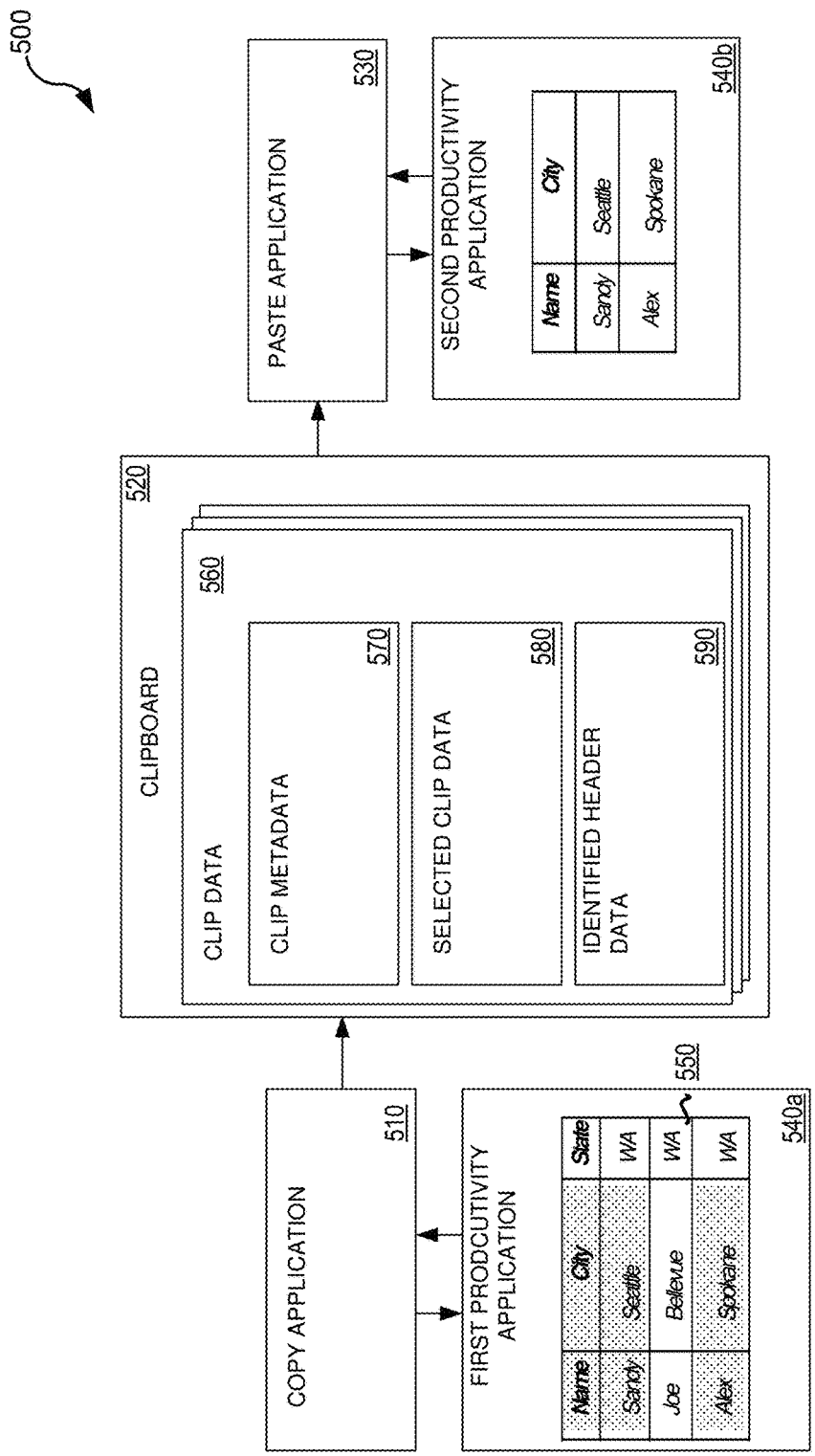
FIG. 5 illustrates a set of components that may be used according to one or more embodiments of the present technology.

FIG. 5 illustrates a set of components 500 that may be used according to one or more embodiments of the present technology. According to the embodiments shown in FIG. 5, the system can include copy application 510, clipboard 520, paste application 530, and one or more productivity applications 540a-540b. Each of these applications or modules can be part of operating system utilities, cloud-based platforms (e.g., accessed via a webpage or other portal), productivity applications, and the like. Other embodiments of the present technology may include some, all, or none of these modules and components along with other modules, applications, and/or components. Still yet, some embodiments may incorporate two or more of these modules, applications, and components into a single module or application and/or associate a portion of the functionality of one or more of these modules with a different module or application. For example, in one embodiment, copy application 510, Clipboard 520, and paste application 530 can be combined into a single copy/paste application.

A user can select data from source 550 in application 540a. While source 550 illustrates a table, other sources such as images, text files, websites, and the like may be selected as the source of the data to be copied. Copy application 510 can allow a user to select disjoint, discontinuous, intermittent, or irregular portions of data. For example, as illustrated in FIG. 5, the user can select portions of the table that have an unselected row between. Other embodiments can select various connected and unconnected segments of words or letters of a sentence or paragraph, or document and the like.

Upon requesting the data be copied, copy application 510 identifies the user selected data copies the selected data into clipboard 520. Clipboard 520 can store a variety of data types, such as, but not limited to text strings, data structures, text and binary stream data, and even application assets. In accordance with various embodiments, copy application 510, clipboard 520, and/or paste application 530 may be implemented in a variety of ways including, but not limited to, java script (e.g. as a plug in to a browser or productivity suite), web-based, operating system utilities, native application, etc.

Copy application 510 and clipboard 520 may store the data in different ways depending on the data type or modality. In some embodiments, the data may be split into different portions for complex data. For example, simple text data can be stored directly in clipboard 520, while more complex data can be stored using references that paste application 530 can resolve and use to reconstruct the data in a desired format. In some embodiments, clip data 560 can include metadata 570, selected clip data 580 and additional data 590. Using this type of organization, paste application 530 can access parts of the data that are needed and reconstruct the data for pasting, possibly in alternate formats as requested by a user. For example, paste application 530 may paste just the clip data, paste the selected data in the table format, paste the selected data adjacent to one another (see, e.g., the table illustrated in application 540b), or paste as text interleave, concatenate text segments into a contiguous string, comma separated, or the like.

As another example, the data from source 550 could be XML or HTML markup that gets copied to clipboard 520. A copy/paste of HTML in the middle of a set of data results in the data being copied to clipboard 520 in a reduced format. For example, copying the middle of an XML document or HTML table may create a copy excerpt that is not well-formed XML or HTML with matching enclosing metadata markup tags and will need some transformation when placed on the clipboard or when pasted to be well-formed XML or HTML when pasted. For example, a simple table such as:

```
<Table>
<row1>one</row1>
<row2>two</row2>
<row3>three</row3>
</Table>
```

Assuming the user selected for copy rows 1 and 3 through any acceptable means, such as highlighting, the information on the graphical user interface and selecting copy, the following information could be selected to be copied to the clipboard buffer:

```
<row1>one</row1>
<row3>three</row3>
```

The clipboard can include a description of the well-formed metadata or means to maintain a way to reproduce the valid XML upon the copy event or paste event so that the final rendering of the information is well-formed.

The table could be buffered on the clipboard in the well-formed layout ready to be pasted.

```
<Table>
    <row1>one</row1>
    <row3>three</row3>
</Table>
```

Regardless of how the data was buffered, when the user pastes the data into another document they get a well-formed metadata markup of the table (if desired by default).

```
<Table>
    <row1>one</row1>
    <row3>three</row3>
</Table>
```

Figure 6:
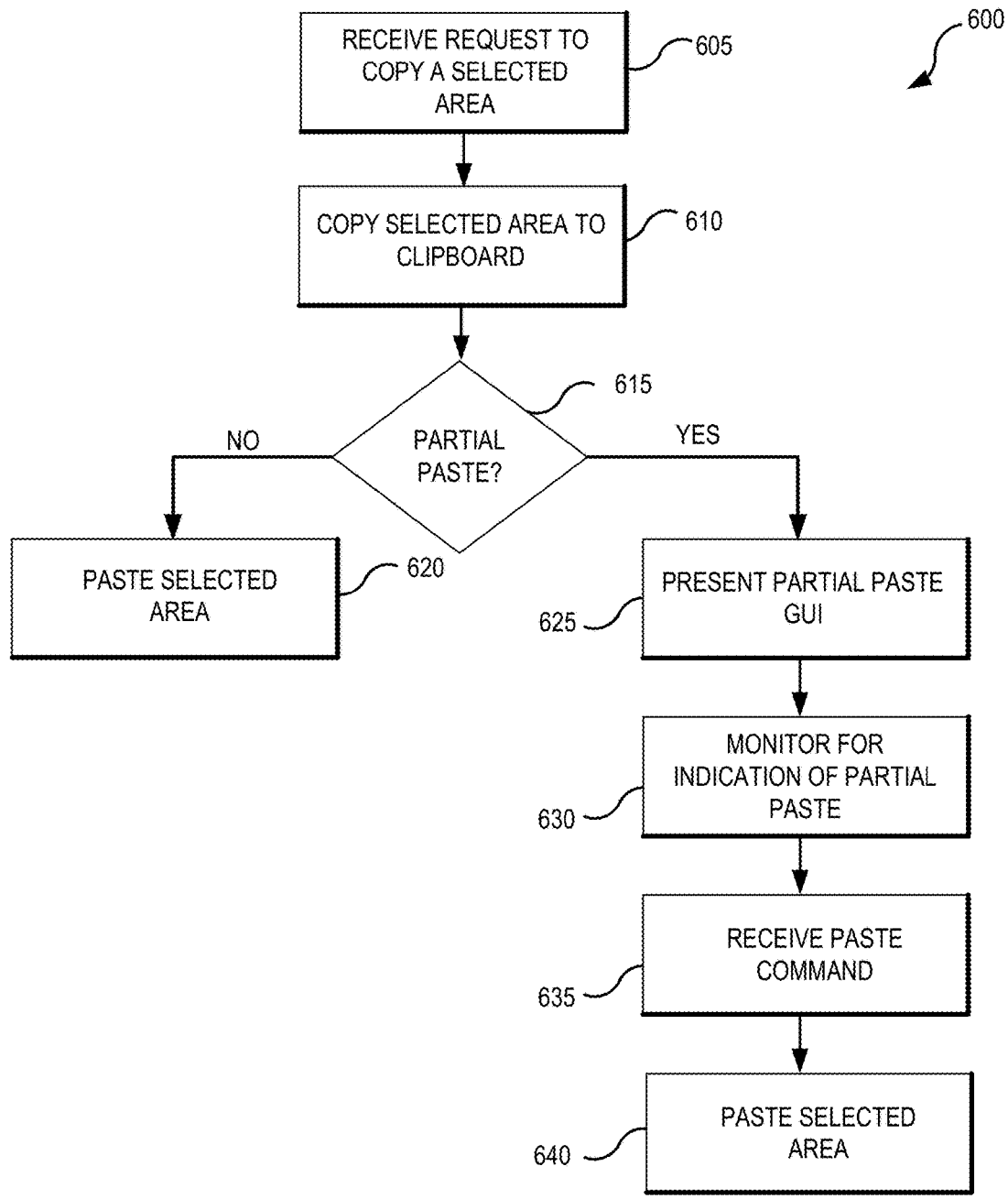
FIG. 6 illustrates an example of a set of operations for allowing a user to partially paste data copied to a clipboard in accordance with some embodiments of the present technology.

FIG. 6 illustrates an example of a set of operations 600 for allowing a user to partially paste data copied to a clipboard in accordance with some embodiments of the present technology. As illustrated in FIG. 6, receiving operation 605 detects a request to copy a selected area. In response to detecting the request to copy a selected area, copy operation 610 copies the selected area or data to one or more clipboards. When the user requests the data to be pasted, determination operation 615 determines whether the selected area or data copied to the clipboards has the option of a partial paste. Determination 615 can be made on a variety of factors. For example, the partial paste functionality may be a subscription feature. As such, if the user has not paid for the subscription the feature will not be available.

The partial paste functionality may not be supported by all copy and/or paste enabled applications, especially in the case of legacy applications interoperating with the latest modern applications. The operating system or application framework (i.e. virtual machine) can hook in to the software stack at 615 to assist legacy applications that do not support the multi-segment copy and/or paste to help provide the user the most up to date and feature rich implementation or support certain transformations of the data copied and/or pasted between applications and/or the system etc. In other embodiments, determination operation 615 can make a decision based on the type or modality of the data, source document, destination document, source computing device, destination computing device or the like.

If determination operation 615 determines that partial paste functionality is not available, then determination operation 615 branches to paste operation 620 where the selected area or data pasted to the target location. If determination operation 615 determines that the partial paste functionality is available, then determination operation 615 branches to presentation operation 625 where a graphical user interface or widget can be presented to the user that will allow for partial pasting. Monitoring operation 630 monitors for an indication of a partial paste selection from the user interface or widget. When receiving operation 630 receives the paste command, receiving operation 630 invokes pasting operation 640 where the selected area or data is pasted subject to the modifications indicated by the user via the partial paste graphical user interface or widget.

Figure 7:
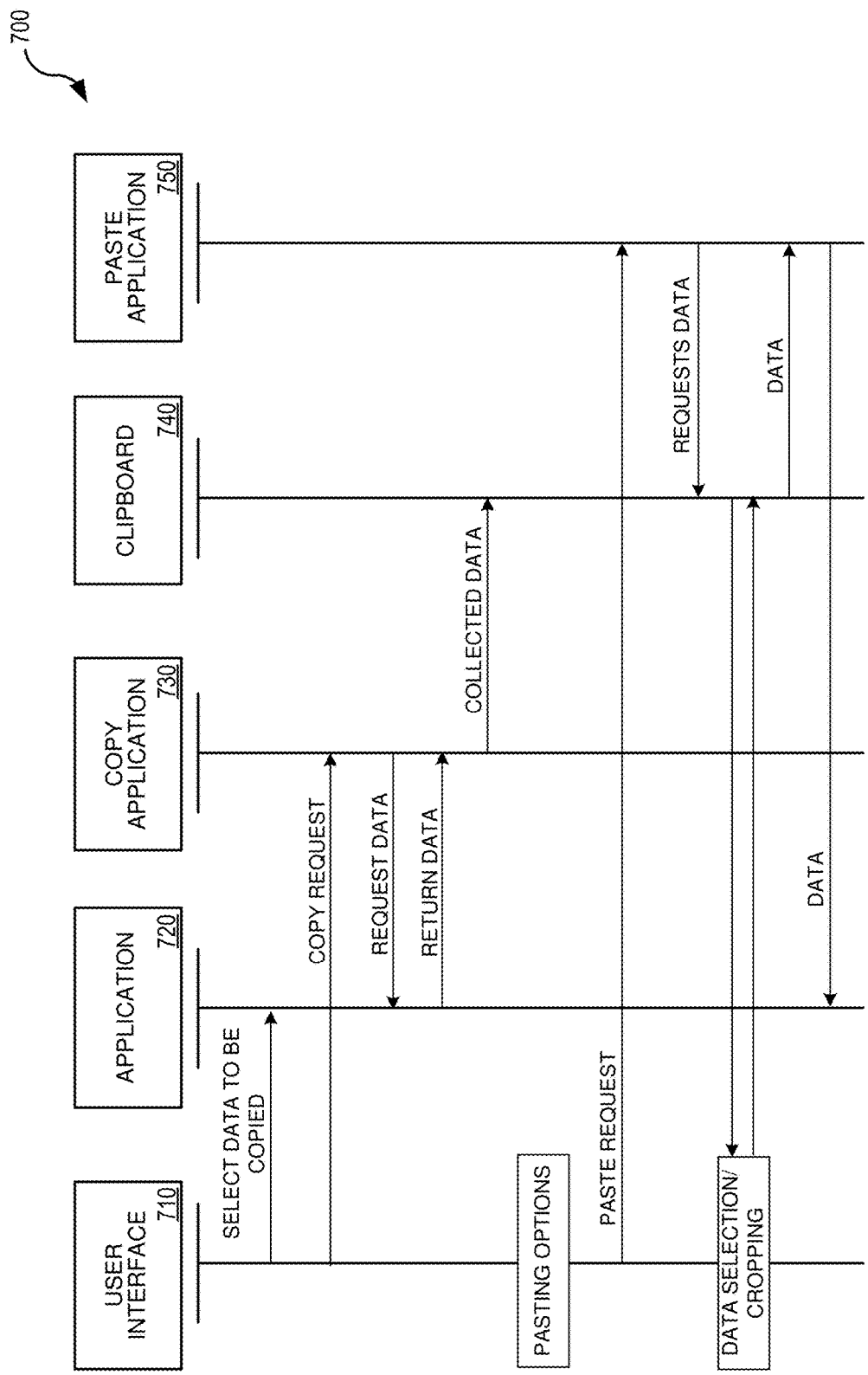
FIG. 7 is a sequence diagram illustrating an example of the data flow between various components according to various embodiments of the present technology.

FIG. 7 is a sequence diagram 700 illustrating an example of the data flow between various components according to various embodiments of the present technology. As illustrated in FIG. 7, a user utilizes user interface 710 to select a portion of a source data in application 720. Then, the user submits via user interface 710 a copy request which is detected by copy application 730. In response to the copy request, copy application 730 copies at least the selected portion of the data within application 720 which is then placed on clipboard 740. When the user requests the data be pasted, multiple pasting options can be presented to the user via user interface 710. Upon selection of one of the pasting options, the paste request is transmitted to paste application 750 that then collects the data from clipboard 740. In some embodiments, before the data is pasted, a data selection or cropping widget may be presented to the user via user interface 710. This tool can allow the user to reform, modify, select a smaller or larger portion of data, or otherwise modify the data stored in clipboard 720 before pasting into application 720.

Although FIG. 7 only shows one application 720, the basic copy and paste mechanism can be considered to be copying and pasting within the same application 720, or 720 can be extended to represent one or more applications that interact with the clipboard and the copy and paste can occur between different applications simply shown as 720 in the diagram of FIG. 7 even though the copy occurs in one application and when the data is pasted it is placed into another application or another instance of the same application such as between two spread sheets or two documents, or a document and a spreadsheet, a document and a browser etc.

Figure 8:
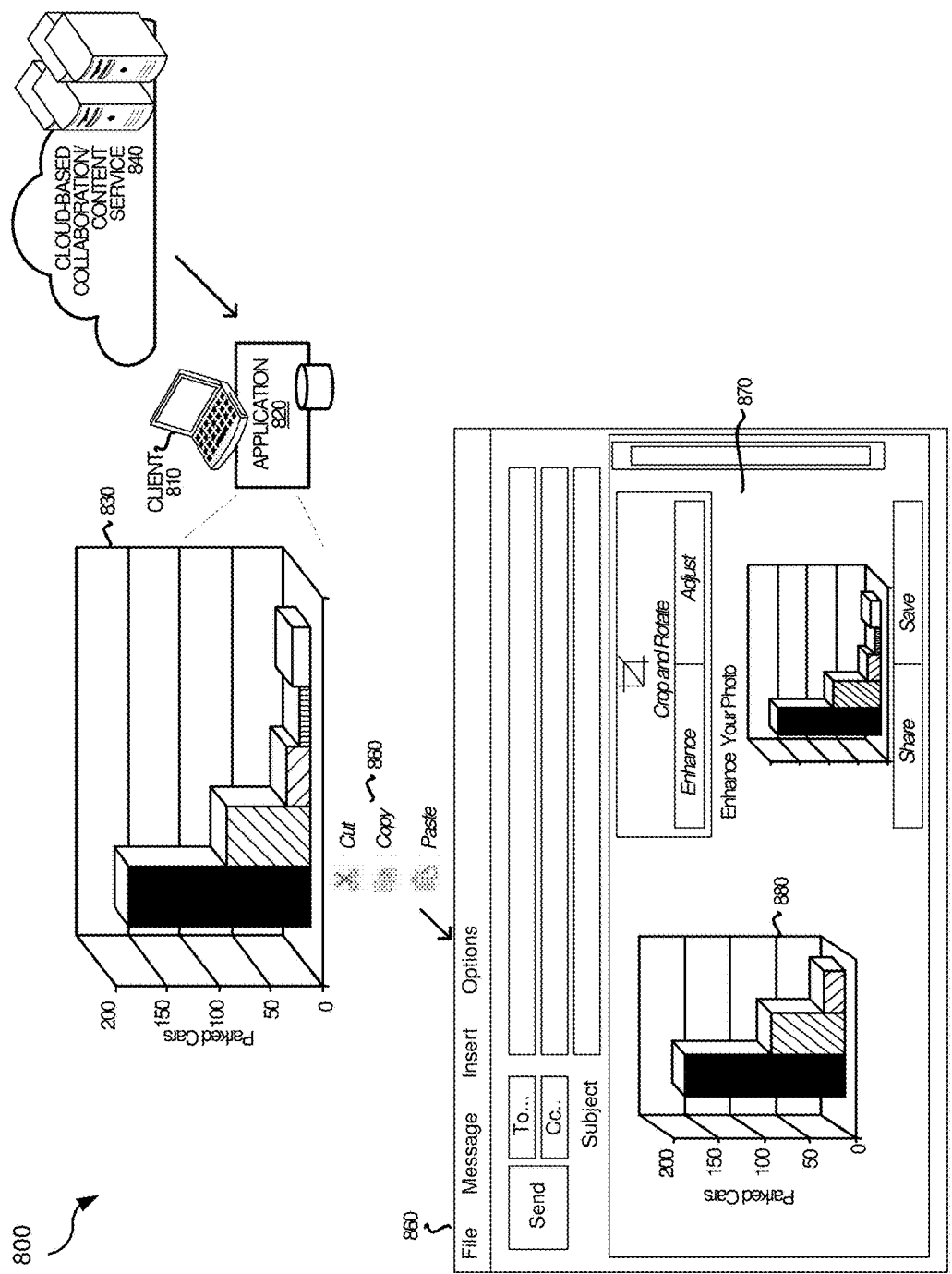
FIG. 8 illustrates an example of a partial paste application that may be used in one or more embodiments of the present technology.

FIG. 8 illustrates an example of a partial paste application that may be used in one or more embodiments of the present technology. As illustrated in FIG. 8, client device 810 runs application 820 that can access a source data 830 from a collaboration or content service 840. As described above, the collaboration or content service 840 is representative of any service providing shared access to cloud-based or centralized content and centralized storage.

As shown in the example of FIG. 8, source data 830 can be opened on client device 810 with application 820. Application 820 can include functionality including GUIs (graphical user interface) running on client device 810, e.g., a PC, mobile phone device, a Web server, or other application servers. Such systems may employ one or more virtual machines, containers, or any other type of virtual computing resource. Within the application, a user can copy all or a portion of source data 830 and request that the selection portion be copied using menu 850 or other command interface (e.g., keyboard shortcut, voice command, etc.). The user can then request, e.g., using menu 850 or other command interface, that the copied source data 830 be pasted into a new location.

As illustrated in e-mail 860, a partial paste application 870 may be automatically or manually invoked which allows the user to edit source data 830 before pasting into e-mail 860. In the embodiments illustrated in FIG. 8, partial paste application 870 can allow the user to crop, rotate, enhance, or otherwise modify source data 830 before pasting. As shown in FIG. 8, the user has selected to remove the last two bars within the histogram. Partial paste application 870 may also allow for the user to share or save a copy of the modified data from the clipboard.

FIG. 9 illustrates computing system 910, which is representative of any system or collection of systems in which the various applications, services, scenarios, and processes disclosed herein may be implemented. For example, computing system 910 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 910 may be implemented as a single apparatus, system, or device or may be implemented in a distributed manner as multiple apparatuses, systems, or devices. Computing system 910 includes, but is not limited to, processing system 920, storage system 930, software 940, applications for copy/paste process 950, communication interface system 960, and user interface system 970. Processing system 920 is operatively coupled with storage system 930, communication interface system 960, and an optional user interface system 970.

Processing system 920 loads and executes software 940 from storage system 930. When executed by processing system 920 for deployment of scope-based certificates in multi-tenant cloud-based content and collaboration environments, software 940 directs processing system 920 to operate as described herein for at least the various processes, operational scenarios, and sequences discussed in the foregoing implementations. Computing system 910 may optionally include additional devices, features, or functionality not discussed for purposes of brevity.

Referring still to FIG. 9, processing system 920 may comprise a micro-processor and other circuitry that retrieves and executes software 940 from storage system 930. Processing system 920 may be implemented within a single processing device, but may also be distributed across multiple processing devices or sub-systems that cooperate in executing program instructions. Examples of processing system 920 include general purpose central processing units, application specific processors, and logic devices, as well as any other type of processing device, combinations, or variations thereof.

Storage system 930 may comprise any computer readable storage media readable by processing system 920 and capable of storing software 940. Storage system 930 may include volatile and nonvolatile, removable and non-removable media implemented in any method or technology for storage of information, such as computer readable instructions, data structures, program modules, or other data. Examples of storage media include random access memory, read only memory, magnetic disks, nonvolatile memory, battery backed memory, Non-Volatile DIMM memory, phase change memory, memristor memory, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 930 may also include computer readable communication media over which at least some of software 940 may be communicated internally or externally. Storage system 930 may be implemented as a single storage device, but may also be implemented across multiple storage devices or sub-systems co-located or distributed relative to each other. Storage system 930 may comprise additional elements, such as a controller, capable of communicating with processing system 920 or possibly other systems.

Software 940 may be implemented in program instructions and among other functions may, when executed by processing system 920, direct processing system 920 to operate as described with respect to the various operational scenarios, sequences, and processes illustrated herein. For example, software 940 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 940 may include additional processes, programs, or components, such as operating system software, virtual machine software, or application software. Software 940 may also comprise firmware or some other form of machine-readable processing instructions executable by processing system 920.

In general, software 940 may, when loaded into processing system 920 and executed, transform a suitable apparatus, system, or device (of which computing system 910 is representative) overall from a general-purpose computing system into a special-purpose computing system. Indeed, encoding software on storage system 930 may transform the physical structure of storage system 930. The specific transformation of the physical structure may depend on various factors in different implementations of this description. Examples of such factors may include, but are not limited to, the technology used to implement the storage media of storage system 930 and whether the computer-storage media are characterized as primary or secondary storage, as well as other factors.

For example, if the computer readable storage media are implemented as semiconductor-based memory, software 940 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 960 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 970 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 970. In some cases, the input and output devices may be combined in a single device, such as a display capable of displaying images and receiving touch gestures. The aforementioned user input and output devices are well known in the art and need not be discussed at length here. In some cases, the user interface system 970 may be omitted when the computing system 910 is implemented as one or more server computers such as, for example, blade servers, rack servers, or any other type of computing server system (or collection thereof).

User interface system 970 may also include associated user interface software executable by processing system 920 in support of the various user input and output devices discussed above. Separately or in conjunction with each other and other hardware and software elements, the user interface software and user interface devices may support a graphical user interface, a natural user interface, an artificial intelligence (AI) enhanced user interface that may include a virtual assistant or bot (for example), or any other type of user interface, in which a user interface to a productivity application may be presented.

Communication between computing system 910 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and Figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A system comprising:
   one or more processors;
   one or more computer readable media; and
   an application stored on the one or more computer readable media, the application including program instructions which, when executed by the one or more processors, direct the one or more processors to:
   identify, in response to a request to copy data, multiple cells selected by a user within a first table,
      wherein the multiple cells selected by the user include at least two cells non-contiguously located within the first table;
   copy at least the multiple cells selected by a user to a clipboard to create multiple entries that include:
      a first entry that includes all of the first table along with a list identifying the multiple cells selected;
      a second entry that includes only the multiple cells selected and preserves a relative location of the multiple cells selected within the first table;
      a third entry that includes interleaved text from data collected from the multiple cells selected; and
      a fourth entry that includes only the multiple cells selected with any unselected cell removed; and
   create, in response to a request to paste, a second table having cells that include multiple cells selected by the user within the first table.

2. The system of claim 1, wherein the second table positions the multiple cells copied from the first table adjacent to each other in a contiguous block.

3. The system of claim 1, wherein instructions when executed by the one or more processors also:
   automatically identify a border that encompasses the multiple cells selected by the user; and
   wherein all of the cells within the border are copied to the clipboard.

4. The system of claim 3, wherein multiple entries are created within the clipboard in response to the request to copy data and the multiple entries include:
   a fifth entry that includes just the multiple cells selected by the user within the first table; and
   a sixth entry that includes all of the cells within the border.

5. The system of claim 1, wherein the clipboard is an application clipboard created using a plug-in on browser running on a client device and wherein the first table is located within a spreadsheet application and the second table is created in a second application.

6. The system of claim 1, wherein the application includes a copy and paste handler to respond to the request to copy and the request to paste.

7. The system of claim 6, wherein the copy and paste handler includes a metadata stripper to strip metadata from the first table.

8. A computer-readable hardware medium having instructions stored thereon instructions that when executed by one or more processors cause a machine to:
   identify, in response to a request to copy data, data selected by a user,
      wherein the data selected by the user include at least two data portions that are not adjacent;
   copy the data selected by a user to a clipboard;
   generate, in response to a request to paste the data, a graphical user interface that can be displayed on a client device, wherein the graphical user interface includes:
      a first option to paste that creates a table preserving a relative location of the data;
      a second option to paste that creates a list of only the data;

a third option to paste that presents a visual representation of the data and allows the user to crop the visual representation; and a fourth option to paste that allows the user to select a subset of the data from data copied to the clipboard; and paste, in response to a selection of one of the options on the graphical user interface, the data that includes the at least two data portions that are not adjacent as selected by the user.

9. The computer-readable hardware medium of claim 8, wherein the data copied is from a table within an application, data from a website, portions of an image, data from an e-mail, or data from a text message.

10. The computer-readable hardware medium of claim 8, wherein the data includes images and the instructions when executed by the one or more processors cause the machine to execute an optical character recognition routine to identify text within the images.

11. The computer-readable hardware medium of claim 8, wherein the data is in multiple, non-contiguously located cells of a table, and wherein the instructions when executed by the one or more processors cause the machine to copy the data from the multiple, non-contiguously located cells selected by the user to the clipboard and create multiple entries in the clipboard that include:

a first entry that includes all of the table along with a list identifying the non-contiguously located cells selected within the table;

a second entry that includes only the non-contiguously located cells selected and preserves a relative location of the non-contiguously located cells selected within the table;

a third entry that includes interleaved text from data collected from the non-contiguously located cells selected within the table; and a fourth entry that includes only the non-contiguously located cells selected within the table with any unselected cell removed.

12. The computer-readable hardware medium of claim 8, wherein data is being viewed by the user via an application that includes a copy and paste handler and a metadata stripper.

13. The computer-readable hardware medium of claim 8, wherein the clipboard includes different data structures that include metadata and the data identified in the request to copy, and wherein the different data structures are accessed by a paste application which then formats the metadata and data before pasting to a location identified by the user.

14. The computer-readable hardware medium of claim 8, wherein the clipboard is an application clipboard or an operating system clipboard.

15. The computer-readable hardware medium of claim 8, wherein the instructions when executed by the one or more processors cause the machine to identify a modality of an application or modality of the data and offer, based on the modality of the application or modality of the data, a set of partial paste functionalities to the user.

16. The computer-readable hardware medium of claim 8, wherein the instructions when executed by the one or more processors cause the machine to identify whether the data includes an image and offer to perform an optical character recognition or additional rendering based on an object identification.

17. A method for copying and pasting data from a first table, the method comprising:

identifying, in response to a request to copy data, multiple cells selected by a user within the first table,
wherein the multiple cells selected by the user include a first selected cell and a second selected cell having at least one unselected cell located in-between the first selected cell and the second selected cell;

copying at least the multiple cells selected by a user to a clipboard;

creating multiple entries in the clipboard that include:
a first entry that includes all of the first table along with metadata identifying the multiple cells selected by the user;
a second entry that includes only the selected cells and preserves a relative location of the multiple cells selected within the first table;
a third entry that includes interleaved text from data collected from the multiple cells selected by the user; and
a fourth entry that includes only the multiple cells selected by the user with any unselected cell removed; and creating, in response to a request to paste, a second table having cells that include at least some of the multiple cells selected by the user within the first table.

18. The method of claim 17, further comprising generating, in response to the request to partially paste the multiple cells, a graphical user interface that can be displayed on a client device, wherein the graphical user interface includes a selection tool that allows a user to select a subset of the multiple cells to include in the second table.

19. The method of claim 17, further comprising:
identifying whether the data includes an image; and
offering, in response to identifying the image within the data, to perform an optical character recognition or an additional rendering based on an object identification.

20. The method of claim 17, wherein the first table is created in a spreadsheet application hosted on a cloud-based service and the clipboard is a plugin created in a thin client.

* * * * *